United States Patent
Pan et al.

(10) Patent No.: US 9,542,773 B2
(45) Date of Patent: Jan. 10, 2017

(54) SYSTEMS AND METHODS FOR GENERATING THREE-DIMENSIONAL MODELS USING SENSED POSITION DATA

(71) Applicant: Google Inc., Mountain View, CA (US)

(72) Inventors: Weibin Pan, Beijing (CN); Liang Hu, Beijing (CN)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/761,803

(22) PCT Filed: May 23, 2013

(86) PCT No.: PCT/CN2013/076171
§ 371 (c)(1),
(2) Date: Jul. 17, 2015

(87) PCT Pub. No.: WO2014/186970
PCT Pub. Date: Nov. 27, 2014

(65) Prior Publication Data
US 2015/0363971 A1 Dec. 17, 2015

(51) Int. Cl.
*G06T 17/00* (2006.01)
*G06T 15/20* (2011.01)
(Continued)

(52) U.S. Cl.
CPC .......... *G06T 17/00* (2013.01); *G06T 3/60* (2013.01); *G06T 7/0046* (2013.01);
(Continued)

(58) Field of Classification Search
CPC .......... G06T 2207/10028; G06T 2200/04; G06T 7/0051; G06T 17/00; G06T 7/0065
See application file for complete search history.

(56) References Cited

U.S. PATENT DOCUMENTS 6,020,891 A * 2/2000 Rekimoto ........... G06F 3/04815
345/157
6,434,278 B1 * 8/2002 Hashimoto ........... G06T 7/0065
345/583
(Continued)

FOREIGN PATENT DOCUMENTS

| CN | 103021017 | 4/2013 |
|---|---|---|
| WO | WO 2013/029674 | 3/2013 |
| WO | WO 2013/029675 | 3/2013 |

OTHER PUBLICATIONS

International Search Report and Written Opinion dated Feb. 27, 2014 for PCT/CN2013/076171—7 pages.
(Continued)

*Primary Examiner* — Barry Drennan
*Assistant Examiner* — Jason Pringle-Parker
(74) *Attorney, Agent, or Firm* — Dority & Manning, P.A.

(57) ABSTRACT

Embodiments include a computer-implemented method for generating a three-dimensional (3D) model. The method includes receiving a first and second sets of sensed position data indicative of a position of a camera device(s) at or near a time when it is used to acquire first and second images of an image pair, respectively, determining a sensed rotation matrix and/or a sensed translation vector for the image pair using the first and second sets of sensed position data, identifying a calculated transformation including a calculated translation vector and rotation matrix, generating a sensed camera transformation including the sensed rotation matrix and/or the sensed translation vector, and, if the sensed camera transformation is associated with a lower error than the calculated camera transformation, using it to generate a 3D model.

19 Claims, 5 Drawing Sheets

(51) Int. Cl.
*G06T 7/00* (2006.01)
*G06T 3/60* (2006.01)
*H04N 13/02* (2006.01)

(52) U.S. Cl.
CPC .......... *G06T 7/0065* (2013.01); *G06T 7/0075* (2013.01); *G06T 15/20* (2013.01); *H04N 13/0207* (2013.01); *G06T 2200/04* (2013.01); *G06T 2200/08* (2013.01); *G06T 2200/21* (2013.01); *G06T 2207/10004* (2013.01); *G06T 2219/2016* (2013.01)

(56) References Cited

U.S. PATENT DOCUMENTS

| | | | | |
|---|---|---|---|---|
| 6,516,099 B1 * | 2/2003 | Davison | ............... | G06T 7/0028 345/419 |
| 6,700,604 B1 * | 3/2004 | Murata | ................. | G01C 11/06 348/135 |
| 8,401,276 B1 * | 3/2013 | Choe | ..................... | G01C 11/06 345/419 |
| 8,416,240 B1 | 4/2013 | Kuffner, Jr. et al. | | |
| 2006/0221072 A1 * | 10/2006 | Se | ........................ | G01C 11/06 345/420 |
| 2007/0103460 A1 * | 5/2007 | Zhang | .................. | G06T 7/2033 345/419 |
| 2007/0288141 A1 * | 12/2007 | Bergen | ................ | G01C 21/005 701/38 |
| 2012/0299702 A1 * | 11/2012 | Edara | ..................... | G01S 19/49 340/8.1 |

OTHER PUBLICATIONS

International Search Report dated Feb. 27, 2014 for PCT/CN2013/076171—2 pages.

* cited by examiner

SYSTEMS AND METHODS FOR GENERATING THREE-DIMENSIONAL MODELS USING SENSED POSITION DATA

BACKGROUND OF THE INVENTION

1. Field of the Invention

Embodiments of this invention relate generally to image modeling and, more particularly, to generating image models using position data associated with images.

2. Description of the Related Art

Three-dimensional (3D) modeling is a process of developing a mathematical representation of a three-dimensional object. The mathematical representation may be referred to as 3D model. A 3D model of a cube, for example, may include a mathematical representation of the corners, edges and faces of the cube that can be used to generate various views of the cube. In a computer environment, the various views can be rendered for display as two-dimensional images that are similar to what a user would see when viewing the object from various vantage points. The display of multiple views can be used to create a simulation. For example, various views of the cube can be displayed in sequence to generate a simulation that recreates what the user would see if they walked about the cube. Although a cube is described for the purpose of illustration, it will be appreciated that similar 3D modeling techniques can be used to generate 3D models of any variety of objects. For example, a home owner may generate a 3D model of their home that can be used to create a "virtual tour" of the interior and exterior of their home for prospective buyers. Similar modeling techniques can be applied to generate 3D models for creating virtual reality simulations, and the like.

In some instances, 3D models are generated using 3D photography. With 3D photography a plurality of photographic images of an object are captured from different vantage points, and the images are combined to generate a 3D model of the object. In traditional systems for generating 3D models, specialized hardware and software is used to capture and process images to construct a 3D model. For example, specialized 3D reconstruction software may be used to identify matching points between images of an object, and process the matching points to estimate the location of points in the real-world (i.e., real-world coordinates) that correspond to the points in the images. The points can be combined to create a 3D model of the object.

Unfortunately, conventional 3D modeling techniques are time-consuming and may not be accurate. For example, conventional 3D modeling algorithms may rely on estimations and interpolations that require an extensive amount of processing to generate a suitable result and that can ultimately generate inaccurate results. Moreover, conventional 3D modeling techniques may not provide a user with an opportunity to re-capture an image view or acquire additional images when they are not satisfied with the current state of the 3D model. For example, in conventional batch processing techniques, a user may be required to acquire all of the images for use in generating a 3D model and post-processing may be applied to the batch of images to generate the 3D model. Unfortunately, the user may have already left the site of the object by the time the 3D model is generated and, thus, may not have an opportunity to return to the site to capture additional images of the object.

SUMMARY OF THE INVENTION

Various embodiments of methods and apparatus for generating photographic tours of geographic locations are provided. In some embodiments, provided is a computer-implemented for generating a three-dimensional (3D) model. The method including receiving a first set of sensed position data indicative of an orientation of a camera device at or near a time when it is used to acquire a first two-dimensional (2D) image, the first set of sensed position data is provided by a sensor of the camera device used to acquire the first 2D image, receiving a second set of sensed position data indicative of an orientation of a camera device at or near a time when it is used to acquire a second two-dimensional (2D) image, the second set of sensed position data is provided by a sensor of the camera device used to acquire the second 2D image, determining a sensed rotation matrix for an image pair comprising the first and second 2D images using the first and second sets of sensed position data, identifying a calculated camera transformation matrix for the image pair, the calculated transformation comprising a calculated translation vector and a calculated rotation matrix, generating a sensed camera transformation matrix for the image pair, the sensed camera transformation comprising a translation vector and the sensed rotation matrix, identifying a set of matching points of the first and second 2D images, determining whether a first error associated with a transformation of the set of matching points using the sensed camera transformation is less than a second error associated with a transformation of the set of matching points using the calculated camera transformation, and in response to determining that a first error associated with a transformation of the set of matching points using the sensed camera transformation is less than a second error associated with a transformation of the set of matching points using the calculated camera transformation, generating a 3D model using the sensed camera transformation, and storing the 3D model in an 3D model repository.

In some embodiments, identifying a calculated camera transformation includes deriving a plurality of candidate calculated transformation matrices using a set of matching points of the first and second 2D images, the candidate calculated transformation matrices each include a translation component and a calculated rotation matrix, identifying a candidate calculated transformation matrix of the plurality of candidate calculated transformation matrices that is associated with the lowest transformation error, and identifying the candidate calculated transformation matrix that is associated with the lowest transformation error as the calculated camera transformation. In some embodiments, deriving a plurality of candidate calculated transformation matrices using a set of matching points includes computing a fundamental matrix between the first and second 2D images using a set of matching points, computing an essential matrix based on the fundamental matrix, and decomposing the essential matrix into four candidate calculated transformation matrices via singular value decomposition.

In some embodiments, the set of matching points includes a subset of a set of matching points of the first and second 2D images. In some embodiments, the set of matching points includes five matching points of a set of matching points of the first and second 2D images.

In some embodiments, determining whether a first error associated with a transformation of the set of matching points using the sensed camera transformation is less than a second error associated with a transformation of the set of matching points using the calculated camera transformation includes selecting a subset of a set of matching points of the first and second 2D images, determining a first error associated with a transformation between the subset of matching points using the calculated camera transformation, determining a second error associated with a transformation between the subset of matching points using the sensed camera transformation, and comparing the first error and the second error to determine whether the first error associated with a transformation of the subset of matching points using the sensed camera transformation is less than a second error associated with a transformation of the subset of matching points using the calculated camera transformation.

In some embodiments, generating a 3D model using the sensed camera transformation matrix includes transforming matching points of the set of matching points to 3D coordinates, and adding the 3D coordinates to the 3D model.

In some embodiments, the translation vector of the calculated camera transformation and the translation vector of the sensed camera transformation are the same. In some embodiments, the first set of sensed position data is indicative of a location of a camera device at or near a time when it is used to acquire a first two-dimensional (2D) image, the second set of sensed position data is indicative of a location of a camera device at or near a time when it is used to acquire a second two-dimensional (2D) image, and the method further comprising determining a sensed rotation matrix for an image pair comprising the first and second 2D images using the first and second sets of sensed position data, the translation vector of the sensed camera transformation includes the sensed rotation matrix, and the translation vector of the calculated camera transformation is calculated based on matching points of the first and second 2D image.

In some embodiments, the sensor includes a gyroscope.

In some embodiments, provided is a non-transitory computer readable medium comprising program instructions stored thereon that are executable by a processor to cause the following steps for generating a three-dimensional (3D) model. The steps including receiving a first set of sensed position data indicative of an orientation of a camera device at or near a time when it is used to acquire a first two-dimensional (2D) image, the first set of sensed position data is provided by a sensor of the camera device used to acquire the first 2D image, receiving a second set of sensed position data indicative of an orientation of a camera device at or near a time when it is used to acquire a second two-dimensional (2D) image, the second set of sensed position data is provided by a sensor of the camera device used to acquire the second 2D image, determining a sensed rotation matrix for an image pair comprising the first and second 2D images using the first and second sets of sensed position data, identifying a calculated camera transformation matrix for the image pair, the calculated transformation comprising a calculated translation vector and a calculated rotation matrix, generating a sensed camera transformation matrix for the image pair, the sensed camera transformation comprising a translation vector and the sensed rotation matrix, identifying a set of matching points of the first and second 2D images, determining whether a first error associated with a transformation of the set of matching points using the sensed camera transformation is less than a second error associated with a transformation of the set of matching points using the calculated camera transformation, and in response to determining that a first error associated with a transformation of the set of matching points using the sensed camera transformation is less than a second error associated with a transformation of the set of matching points using the calculated camera transformation, generating a 3D model using the sensed camera transformation, and storing the 3D model in an 3D model repository.

In some embodiments, provided is a computer-implemented for generating a three-dimensional (3D) model. The method including receiving a first set of sensed position data indicative of a position of a camera device at or near a time when it is used to acquire a first two-dimensional (2D) image, the first set of sensed position data is provided by an integrated sensor of the camera device used to acquire the first 2D image, receiving a second set of positioning sensor data indicative of a position of a camera device at or near a time when it is used to acquire a second two-dimensional (2D) image, the second set of sensed position data is provided by an integrated sensor of the camera device used to acquire the second 2D image, determining a sensed rotation matrix and/or a sensed translation vector between the first and second 2D images using the first and second sets of sensed position data, identifying a calculated camera transformation comprising a calculated translation vector and a calculated rotation matrix, generating a sensed camera transformation comprising the sensed rotation matrix and/or the sensed translation vector, identifying a set of matching points of the first and second 2D images, determining whether a first error associated with a transformation of the set of matching points using the sensed camera transformation is less than a second error associated with a transformation of the set of matching points using the calculated camera transformation, and in response to determining that a first error associated with a transformation of the set of matching points using the sensed camera transformation is less than a second error associated with a transformation of the set of matching points using the calculated camera transformation, generating a 3D model using the sensed camera transformation, and storing the 3D model in an 3D model repository.

DETAILED DESCRIPTION

Figure 1:
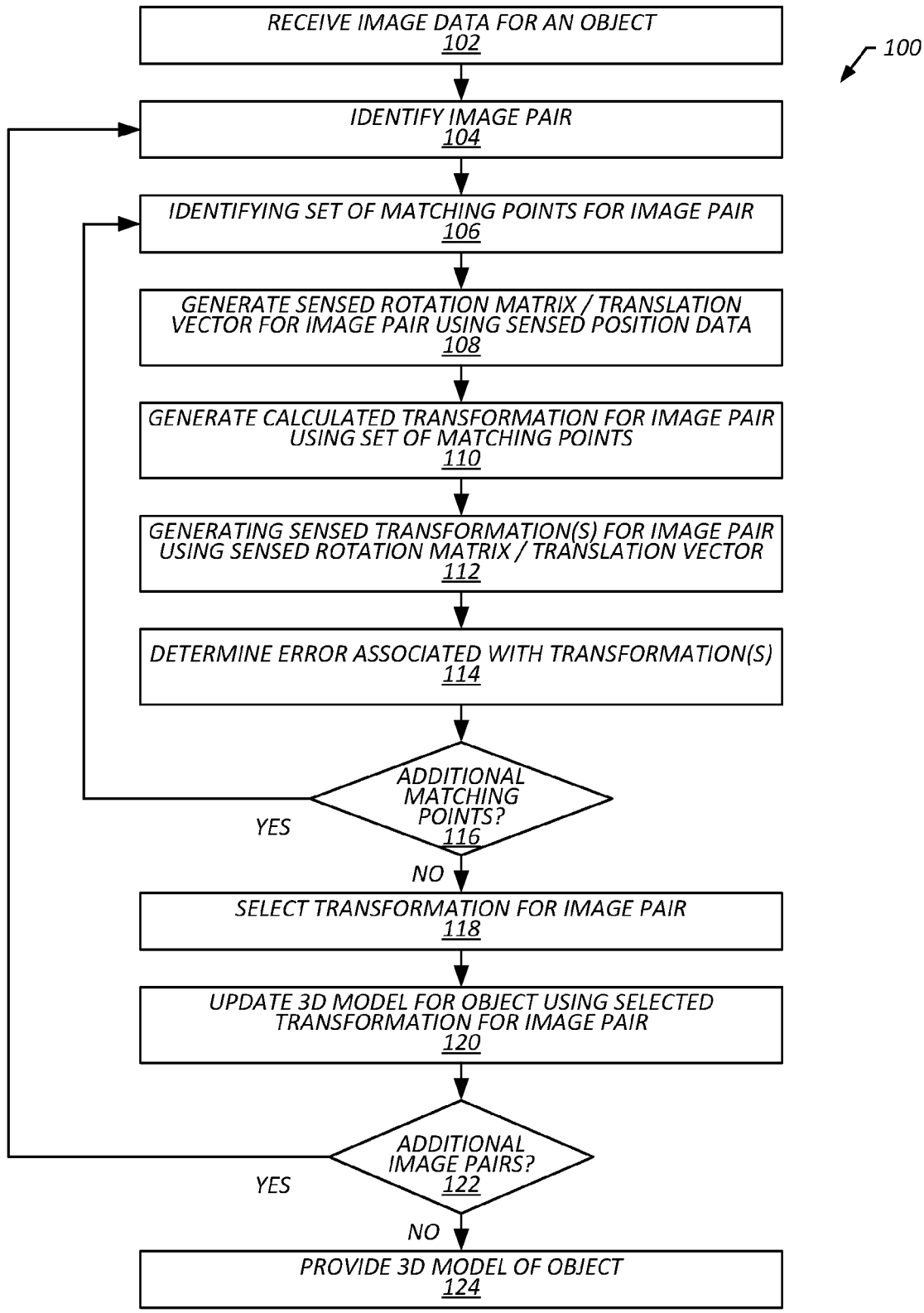
FIG. 1 is a flowchart that illustrates a method of generating a three-dimensional (3D) model of an object in accordance with one or more embodiments of the present technique.

As discussed in more detail below, provided are systems and methods for generating three-dimensional (3D) models using position data. A 3D model may include a mathematical representation of an object. In some instances a 3D model can be used to generate various views about an object. A 3D model of a cube, for example, may include a mathematical representation of the corners, edges and faces of the cube that can be used to generate various views of the cube. Such views may be used to simulate what a user would see if looking at the cube from various vantage points. A 3D model may include a collection of 3D points (e.g., 3D coordinates) that correspond to points in the real world (i.e., real-word coordinates). For example, a 3D model of a cube may include a collection of 3D coordinates that correspond to real-world locations of the eight corners of the cube, various locations along the edges of the cube and various locations on the six faces of the cube.

In some embodiments, a 3D model is generated using a plurality of images. For example, a 3D model of an object may be generated using a plurality of two-dimensional (2D) images of the object taken from different vantage points about the object. In some embodiments, a 3D model is generated by identifying matching points within a plurality of images and transforming the matching points to 3D coordinates that are used to generate the 3D model. For example, five portions of first 2D image (image A) taken from first vantage point that depict five different locations on the cube's surface, may be matched with five corresponding portions of a second 2D image taken (image B) from second vantage point that is proximate the vantage point of the first image. The locations of the five matching points within the two images can be transformed to generate five corresponding 3D coordinates that represent real-word locations of the five different locations on the cube's surface.

Such transformations can be done using any number of matching points between various pairs of 2D images to generate any number of 3D coordinates for use in generating the 3D model. For example, other sets of matching points between the first and second images (images A and B), between the first image and a third image (images A and C), between the second and the third images (images B and C), and so forth can be identified and used to identify additional sets of 3D coordinates for inclusion in the 3D model of the cube.

In some embodiments, a transformation to 3D coordinates includes generating a transformation matrix (or "transformation") between images. For example, five random matching points between the first image (image A) and the second image (image B) can be used to generate a transformation matrix ($T_{AB}$). The transformation matrix ($T_{AB}$) can then be used to map points of images A and B to 3D/real-world coordinates.

In some embodiments, the transformation matrix for two images is generated with the assistance of position data that is indicative of an orientation of a camera device at or near the time when the camera device is used to acquire an image used in developing the transformation. For example, generation of the transformation matrix for images A and B may be based at least in part on a first set of sensed position data that is indicative of an orientation/location of a camera device at or near a time when it is used to acquire a first two-dimensional (2D) image, and a second set of sensed position data that is indicative of an orientation/location of a camera device at or near a time when it is used to acquire a second two-dimensional (2D) image. The sensed position data for an image may be provided by a sensor associated with the camera device used to acquire the image. For example, sensed position data for image A may include position data provided by an integrated position sensor, such as gyroscope and/or global positioning system (GPS) sensor of a camera used to acquire image A.

In some embodiments, sensed position data includes orientation data and/or location data. Orientation data may be indicative of an angle/direction of a camera at or near a time when it is used to acquire the image. For example, orientation data for image A may include a vector that is indicative of the aim/direction of the camera's filed of view at or near a time when it is used to acquire image A. Location data for an image may be indicative of a location of the camera at or near a time when it is used to acquire the image. For example, location data for image A may include geographic coordinates indicative of a geographic location of the camera at or near a time when it is used to acquire image A.

In some embodiments, generating a transformation matrix for a pair of images includes (1) calculating a transformation matrix (a "calculated camera transformation" or a "calculated transformation") ($P_C$) based on matching points for the images and (2) generating a modified transformation matrix (a "sensed camera transformation" or a "modified transformation") ($P_M$) that includes a sensed rotation matrix element (R') and/or a sensed translation vector element (t'). The modified transformation may be the same as the calculated transformation, but having the sensed rotation matrix and/or the sensed translation vector substituted for a corresponding calculated rotation matrix and/or calculated translation vector element, respectively, of the calculated transformation. For example, a sensed rotation matrix (R') and a sensed translation vector (t') may be generated based on location data of positioning sensor data, a calculated transformation, $P_C=[R|t]$, including calculated rotation matrix (R) and calculated translation vector (t), may be generated using matching points of images A and B, and a modified transformation, may be generated by substituting the sensed rotation matrix (R') for the calculated rotation matrix (R) and/or substituting the sensed translation vector (t') for the calculated translation vector (t) of the calculated transformation. In some embodiments, one or more of three modified transformation can be generated based on the substitutions (e.g., $P_{M1}=[R'|t]$, $P_{M2}=[R|t']$, and $P_{M3}=[R'|t']$).

In some embodiments, the process may be repeated for any number of sets of matching points. For example, where images A and B have one-hundred matching points (i.e., twenty sets of five matching points), a calculated transformation and one or more modified transformations can be generated for each of the sets of points to generate twenty calculated transformations and one or more modified transformation(s) for each of the sets of points.

In some embodiments, errors for the resulting transformations for a pair of images are compared to one another to determine which of the transformations should be used as the transformation for the pair of images. For example, an error can be determined for each of the transformations using sets of matching points for images A and B, and the transformation having the lowest error can be identified as the transformation for the image pair. The selected transformation can be used to generate 3D/real-world coordinates for the object. The process can be repeated in a similar manner for each of the pairs of images to generate an expansive set of 3D/real-word coordinates that are used to generate/update the 3D model of the object. For example, where ten images of the object exist, the process can be repeated for adjacent image pairs A and B, B and C, C and D and so forth to generate 3D/real-word coordinates that are added to the 3D model of the object.

Although, in certain embodiments, modeling is described in the context of a geometric object, such as a cube or wedge, for the purpose of illustration, similar 3D modeling techniques can be used to generate 3D models of any variety of objects. For example, a home owner may generate a 3D model of their home that can be used to create a "virtual tour" of the interior and exterior of their home for prospective buyers. Further, the modeling techniques may be used to generate 3D models for creating virtual reality simulations, and the like.

By making use of sensed rotation and translation data that can be used to generate a rotation matrix and a translation vector, a 3D reconstruction can be executed efficiently and can, in some embodiments, provide for generation of 3D models on the fly (e.g., in real-time). For example, in some embodiments, a 3D reconstruction of an object may be generated in a matter of seconds of acquiring an image using techniques described herein, and a corresponding 3D model may be provided to a user on-the-fly (e.g., every few seconds) as they are acquiring images. Such rapid feedback may enable a user to instantly review the 3D model that is created based on the images they have acquired, and provide the user with the opportunity to re-capture or take additional photographs of an object when they are not satisfied with the current state of the 3D model. This may be advantageous to conventional processing intensive techniques that may not provide a user with an opportunity to re-capture an image view or acquire additional images when they are not satisfied with the current state of the 3D model.

FIG. 1 is a flowchart that illustrates a method 100 of generating a three-dimensional (3D) model of an object. Method 100 generally includes receiving image data for an object (e.g., including sensed position data) (block 102), identifying an image pair (block 104), identifying a set of matching points for the image pair (block 106), generating a sensed rotation matrix and/or sensed translation vector for the image pair using the sensed position data (block 108), generating a calculated transformation for the image pair using the set of matching points (block 110), generating sensed (or "modified") transformation(s) for the image pair using the sensed rotation matrix and/or the sensed translation vector for the image pair (block 112), and determining error associated with the transformations (block 114). If additional matching points for the image pair need to be considered, the method may include repeating the steps of generating a calculated transformation matrix for the image pair using the next set of matching points and generating sensed ("modified") transformation(s) for the image pair using the sensed rotation matrix and/or sensed translation vector for the image pair, and determining the error associated with the transformations (block 116). If additional matching points for the image pair do not need to be considered, the method may include selecting a transformation for the image pair (e.g., using the determined errors for the transformations) (block 118), and updating the 3D model of the object using the selected transformation for the image pair (e.g., generating 3D coordinates using the selected model and adding them to the 3D model) (block 120). If additional image pairs remain to be processed, the method may repeat the corresponding steps for the next image pair (block 122). If no additional image pairs need to be updated, the updated 3D model may be provided (e.g., displayed to a user, stored in memory, and/or the like) (block 124).

Figure 2:
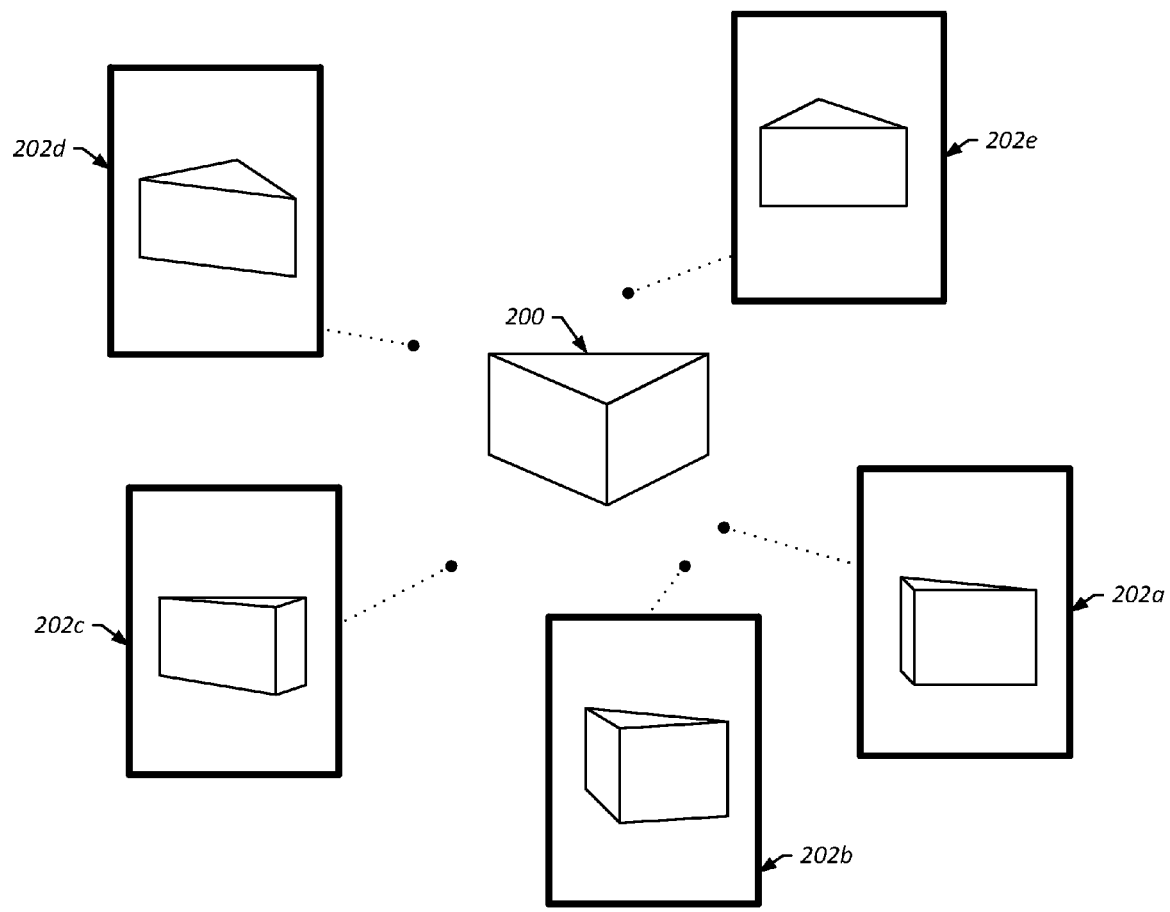
FIG. 2 illustrates an object and 2D images taken from various vantage points about the object in accordance with one or more embodiments of the present technique.

In some embodiments, receiving image data (block 102) includes receiving a plurality of 2D images of an object. For example, receiving image data may include receiving a plurality of images taken from various vantage points about an object, such as a wedge shaped object 200 depicted in FIG. 2. FIG. 2 illustrates a wedge shaped object ("wedge") 200 and 2D images (e.g., photographs) 202 taken from various vantage points about wedge 200. Images 202 may include five 2D images 202a-202e taken from various vantage points about wedge 200. Five 2D images are depicted for the purpose of illustration although any number of images may be acquired. For example, images 202 may include one-hundred photographs of wedge 200. In some embodiments, images 202 include 2D digital images acquired using a 2D digital camera or other digital photography device. For example, a user may acquire images 202a-202e using a digital camera of his smart phone as he walks around wedge 200.

In some embodiments, images 200 include digital image data. For example, each of images 200 may include pixmap data corresponding to pixels of the image. Images 200 may each include an image file, such as a JPEG (Joint Photographic Experts Group) image file, a bitmap BMP (Windows bitmap) image file, a PNG (Portable Network Graphics) image file, a RAW (raw) image file, and/or the like. Receiving image data may include receiving raw image data (e.g., a stream of pixels) and/or image data provide in an image file format.

In some embodiments, receiving image data for an image includes receiving position data associated with the image. For example, receiving image data for each of images 202a-202e may include receiving position data that is indicative of the perspective/vantage point from which the image was acquired. In some embodiments, position data may include orientation and/or location data associated with the image. Orientation data for an image may be indicative of an orientation (e.g., angle/direction) of the camera's field of view at or near a time when it is used to acquire the image. For example, orientation data for each of images 202a-202e may include a vector that is indicative of the aim of a camera at or near a time when it is used to acquire the respective image. Location data for an image may be indicative of a location of a camera at or near a time when it is used to acquire the image. For example, location data for each of images 202a-202e may include geographic coordinates indicative of a geographic location of a camera at or near a time when it is used to acquire the image.

In some embodiments, position data for an image is provided via a position sensor associated with the camera used to acquire the image. For example, position data may be provided by an integrated position sensor of the camera. In some embodiments, a position sensor includes a gyroscope or similar device for obtaining orientation data and/or a GPS device or similar device for obtaining location data. For example, a gyroscope and a GPS device integrated into a user's phone may detect an orientation and location, respectively, of the phone at or near the time when the user acquires image 200a using the phone's camera, and this position data (e.g., orientation data and/or location data) may be associated with image 200a. Position data acquired using one or more sensors associated with a camera used to acquire an image may be referred to herein as "sensed position data" for the image (e.g., including "sensed orientation data" and/or "sensed location data" for the image).

In some embodiments, position data is embedded within an image file. For example, sensed position data for an image may be provided as positional metadata included with the image file for the image. An image file that includes orientation and/or location data may be referred to as a "position-tagged" image. An image file that includes geographic location data may be referred to as a "geo-tagged" image. An image file that includes orientation data may be referred to as an "orientation-tagged" image.

Method 100 may include identifying an image pair (block 104). In some embodiments, identifying an image pair includes identifying two images that have similar positional characteristics and are, thus, expected to depict a similar vantage point of the object. In some embodiments, images pairs are identified based on the sequence in which they are acquired. For example, an image may be paired with images taken immediately before and/or after the image. If, for example, images 202a, 202b, 202c, 202d and 202e are acquired in sequence, images 202a and 202b may be identified as a first image pair, images 202b and 202c may be identified as a second image pair, images 202c and 202d may be identified as a third image pair, and so forth. In some embodiments, images pairs are identified based on their positions relative to one another. For example, images 202a and 202b may be identified as an image pair based on their locations being within a threshold distance of one another and/or the images having a similar orientation, whereas images 202c and 202b may not be identified as an image pair based on their locations being greater than a threshold distance from one another and/or the images not having a similar orientation.

Figure 3:
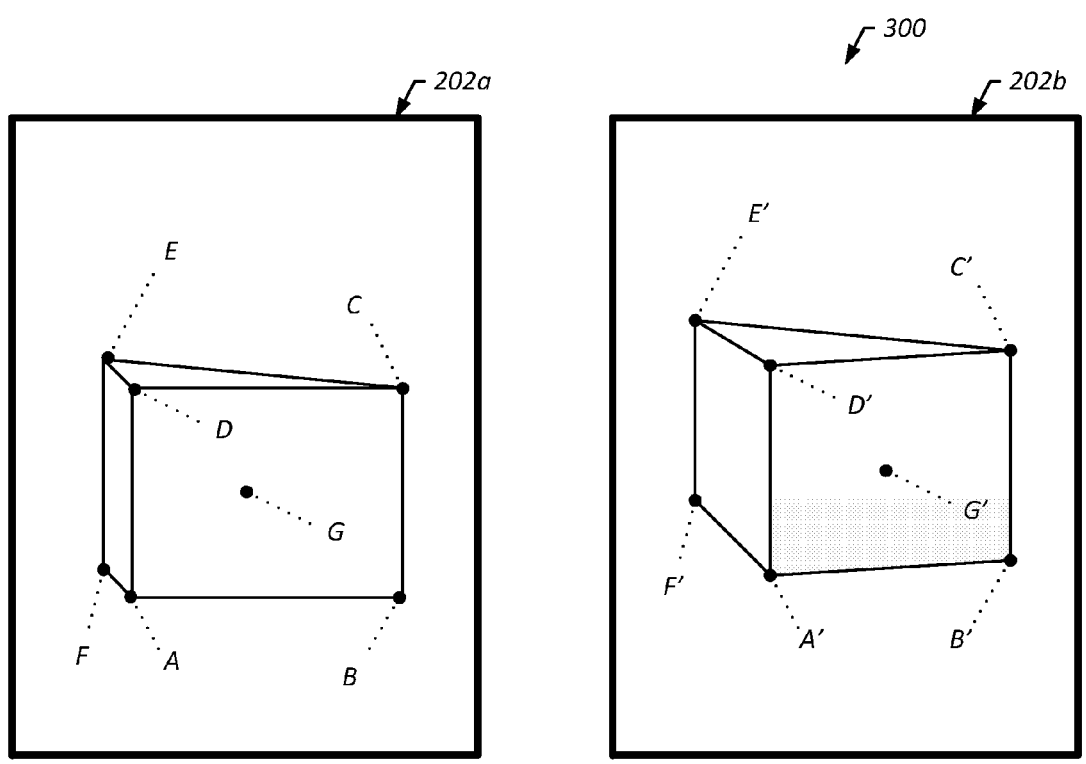
FIG. 3 illustrates exemplary matching points of an image pair in accordance with one or more embodiments of the present technique.

Method 100 may include identifying matching points for an image pair (block 106). In some embodiments, identifying matching points for an image pair includes identifying a plurality of points within the two images that appear to match one another (e.g., that are photographic representations of the same portion of the image scene). For example, where images 202a and 202b have been identified as an image pair, identifying matching points for an image pair may include identifying points within images 202a and 202b that match one another. FIG. 3 illustrates exemplary matching points of an image pair 300. Image pair 300 includes images 202a and 202b. Points A, B, C, D, E, F and G of image 202a may be identified as matching points A', B', C', D', E', F' and G' of image 202b. In some embodiments, matching of points may be accomplished using any suitable image feature matching technique, such as SIFT, FAST and/or the like. Although seven matching pairs of points are depicted for the purpose of illustration, images may include any number of matching pairs of points. For example, images 202a and 202b may include one-thousand matching points.

Method 100 may include generating a sensed rotation matrix and/or sensed translation vector for the image pair using sensed position data (block 108). A rotation matrix may be a matrix that is used to perform a rotation in Euclidean space. A transformation vector may be a function that can be used to moves every point a constant distance in a specified direction in Euclidean space. In some embodiments, generating a sensed rotation matrix and/or sensed translation vector for the image pair using sensed position data includes generating a sensed rotation matrix and/or sensed translation vector for the image pair using sensed position data of the received image data. For example, a sensed rotation matrix (R') and/or sensed translation vector (t') for the image pair including images 202a and 202b may be generated based on differences between the sensed position data associated with image 202a and the sensed position data associated with image 202b. A sensed rotation matrix for an image pair may be generated based on orientation data associated with the images. For example, a sensed rotation matrix (R') the image pair including images 202a and 202b may be generated based on differences between a first orientation indicated by the sensed orientation data associated with image 202a and an second orientation indicated by the sensed orientation data associated with image 202b. A sensed translation vector for an image pair may be generated based on location data associated with the images. For example, a sensed translation vector (t') the image pair including images 202a and 202b may be generated on differences between a first location indicated by the sensed location data associated with image 202a and an second location indicated by the sensed location data associated with image 202b.

Method 100 may include generating a calculated transformation for the image pair using the set of matching points (block 110). In some embodiments, generating a calculated transformation for the image pair using the set of matching points includes generating a plurality of candidate transformation matrices based on the image data (e.g., not using the sensed position data), and identifying the candidate transformation matrix with the lowest associated error as the calculated transformation. In some embodiments, the process of generating a calculated transformation for an image pair includes the following:

1) identifying a set of matching points for the images of the image pair;
2) computing a fundamental matrix (F) for the image pair using the set of matching points;
3) computing an essential matrix (E) for the image pair based on the fundamental matrix (F) using the following relationship:

$$E = K_2^T F K_1 \quad (1)$$

where K1 and K2 are the intrinsic calibration matrix of the first and second images, respectively, of the image pair;

4) decomposing the essential matrix (E) using the following relationship:

$$E = U^* \mathrm{diag}(1,1,0)^* V^T \quad (2)$$

to derive the following four candidate calculated transformation matrices:

$$P1 = [R_a | t] \quad (3)$$

$$P2 = [R_a | -t] \quad (4)$$

$$P3 = [R_b | t] \quad (3)$$

$$P4 = [R_b | -t] \quad (4)$$

where:

$$R_a = UDV^T \quad (5)$$

$$R_b = UD^T V^T \quad (6)$$

$$D = \begin{pmatrix} 0 & 1 & 0 \\ -1 & 0 & 0 \\ 0 & 0 & 1 \end{pmatrix} \quad (7)$$

and where R is a calculated rotation matrix and t is a calculated translation matrix.

In some embodiments, identifying a set of matching points for the pair of images includes identifying a subset of matching points of the image pair. For example, identifying a set of matching points for the image pair may include randomly identifying five pairs of matching points between the images of the image pair. A set of matching points for the image pair of images 202a and 202b may include, for example, the point-pairs A-A', C-C', D-D', F-F' and G-G'.

In some embodiments, an error may be determined for each of the candidate calculated transformation matrices, and the candidate calculated transformation matrix having the lowest error associated therewith may be selected as the calculated transformation matrix (the "calculated transformation") for the image pair. In some embodiments, an error for a transformation matrix may be calculated by applying the transformation matrix to known locations of the matching points to generate estimates locations of the points and determining a resulting error between the known and estimated locations of the points. For example, a transformation matrix may be applied to the known locations of a set of matching points in image 202a to calculate the estimated locations of the matching points in image 202b, and an error for the transformation matrix can be determined based on the difference between the estimated locations and the known of the matching points in image 202b. An error determination can be repeated for each of the four candidate calculated transformation matrices for the image pair including images 202a and 202b, and the candidate calculated transformation matrix having the lowest error may be identified as the calculated transformation for the image pair.

In some embodiments, only a subset of all of the matching points for the image pair may be considered when calculating the errors for a transformation. For example, a transformation matrix may be applied to the known locations of the set of matching points B, H, I, J and L in image 202a to calculate the estimated locations B", H", I", J" and L" of the matching points in image 202b, and an error for the transformation matrix can be determined based on the difference between the estimated locations B", H", I", J" and L" and the known location B', H', I', J' and L' of the matching points in image 202b. In some embodiments, the set of matching points used to calculate error may be different from the set of points used to generate the fundamental matrix (F). In some embodiments, the set of matching points used to calculate error may be the same as the set of points used to generate the fundamental matrix (F). Using less than all of the matching points for an image pair may help to reduce processing load and reduce the time needed to identify a transformation for the image pair.

Method 100 may include generating sensed (or "modified") transformation(s) for the image pair using the sensed rotation matrix and/or the sensed translation vector for the image pair (block 112). In some embodiments, generating sensed (or "modified") transformation(s) for the image pair using the sensed rotation matrix and/or the sensed translation vector for the image pair includes substituting the sensed rotation matrix (R') and/or the sensed translation vector (t') for the rotation matrix (R) or calculated translation vector (t) of the selected calculated transformation. For example, where P1 (i.e., P1=[R a|t]) is identified as the calculated transformation for images 202a and 202b, a modified transformation (PM) for the image pair may be generated by substituting the sensed rotation matrix (R') for the calculated rotation matrix (Ra) and/or substituting the sensed translation vector (t') for the calculated translation vector (t), respectively, of the calculated transformation. Thus, a modified transformation (PM) for the image pair may include one or more of the following:

$$P_{M1}=[R'|t] \quad (8)$$

$$P_{M2}=[R|t'] \quad (9)$$

$$P_{M3}=[R'|t'] \quad (10).$$

If, for example, only the sensed rotational matrix is being used (e.g., if the sensed translation matrix is not available or reliable), the modified transformation ($P_M$) for the image pair may be that of equation (8), i.e., $P_M$=[R'|t].

Method 100 may include determining error associated with the transformations (block 114). In some embodiments, determining error associated with the transformations includes determining an error associated with the modified transformation matrix (or matrices). The error may be calculated in a manner that is the same or similar to that discussed above. For example, a modified transformation matrix may be applied to the known locations of the set of matching points B, H, I, J and L in image 202a to calculate the estimated locations B", H", I", J" and L" of the matching points in image 202b, and an error for the transformation can be determined based on the difference between the estimated locations B", H", I", J" and L" and the known location B', H', I', J' and L' of the matching points in image 202b. In some embodiments, the set of matching points used to calculate error may be different from the set of points used to generate the fundamental matrix (F). In some embodiments, the set of matching points used to calculate error may be the same as the set of points used to generate the fundamental matrix (F) and/or the set of points used to calculate error for the candidate transformation matrices.

If the process requires generation of matrices based on more than one set of matching points, method 100 may include repeating steps 106 to 114 for each of the remaining sets of matching points (block 116). For example, where it is required that matrices for at least three sets of five randomly chose points are to be generated (e.g., N=3), steps 106-114 may be repeated two more times for second and third sets of matching points for the image pair. In such an embodiment, a minimum of six or transformations may be generated. If, for example, only one of the sensed rotation matrix (R') or the sensed translation vector (t') is substituted to generate a modified transformation (see e.g., equation 8 or equation 9), a calculated transformation and a modified transformation may be generated for each of three sets of matching points (resulting in a total of six transformations). If, for example, both of the sensed rotation matrix (R') and the sensed translation vector (t') are substituted to generate modified transformations (see e.g., equations (8), (9) and (10)), a calculated transformation and three modified transformations may be generated for each of three sets of matching points (resulting in a total of twelve transformations).

If it is determined that no additional sets of matching points needs to be processed, method 100 may proceed to selecting a transformation for the image pair (block 118). In some embodiments, selecting a transformation for the image pair includes selecting the transformation associated with the lowest error. If, for example, there are total of six transformations based on analysis of three sets of points and substitution of only a sensed rotation matrix (R'), e.g., $P_{C1}$=[R|t], $P_{C2}$=[R|t], $P_{C3}$=[R|t], $P_{M1}$=[R'|t], $P_{M2}$=[R'|t], $P_{M3}$=[R'|t]), and the transformation $P1_M$ has the lowest error associated therewith, the transformation $P1_M$ may be selected as the transformation for the image pair based on it having the lowest error of the six transformations.

Method 100 may include updating a 3D model for the object using the selected transformation for the image pair (block 120). In some embodiments, updating a 3D model for the object using the selected transformation for the image pair includes transforming the matching points of the image pair to 3D/real-world coordinates using the selected transformation. For example, if $P1_M$ is selected as the transformation matrix for the image pair including images 202a and 202b, the one-hundred matching points of images 202a and 202b can be transformed to 3D/real-world coordinates using $P1_M$, and the 3D/real-world coordinates can be added to the 3D model of wedge 200.

If it is determined that additional image pairs exists or have otherwise been identified for use in generating the 3D model, method 100 may proceed to repeating steps 104-120 for each of the additional image pairs (block 122). For example, if fifty image pairs are identified, steps 104-120 may be repeated for each of the remaining forty-nine image pairs.

If it is determined that no additional image pairs exists or have otherwise been identified for use in generating the 3D model, method 100 may proceed to providing the 3D model of the object (block 124). In some embodiments, providing the 3D model of the object includes rendering the 3D model for display, storing the 3D model, transmitting the 3D model, and/or the like. For example, the resulting 3D model may be rendered for display to a user. In some embodiments, a 3D reconstruction of an object is be generated shortly after acquiring image data, and an updated 3D model is provided to a user on-the-fly (e.g., every few seconds) as they are acquiring images for use in generating the 3D model. This may enable a user to instantly review the 3D model that is created based on the images they have acquired, and allow the user to re-capture an image view or take additional images when they are not satisfied with the current state of the 3D model. For example, if the user views the 3D model and determines that a particular view of the object is not sufficiently represented, the user may acquire additional images of the object, and the additional images may be processed as discussed with regard to method 100.

It will be appreciated that method 100 is an exemplary embodiment of a method that may be employed in accordance with the techniques described herein. Method 100 may be modified to facilitate variations of its implementations and uses. Method 100 may be implemented in software, hardware, or a combination thereof. Some or all of method 100 may be implemented by one or more of the modules/applications described herein, such as 3D model module 412 and/or application 408 depicted and described in more detail below with regard to FIG. 4. The order of the steps of method 100 may be changed, and various elements may be added, reordered, combined, omitted, modified, etc.

Figure 4:
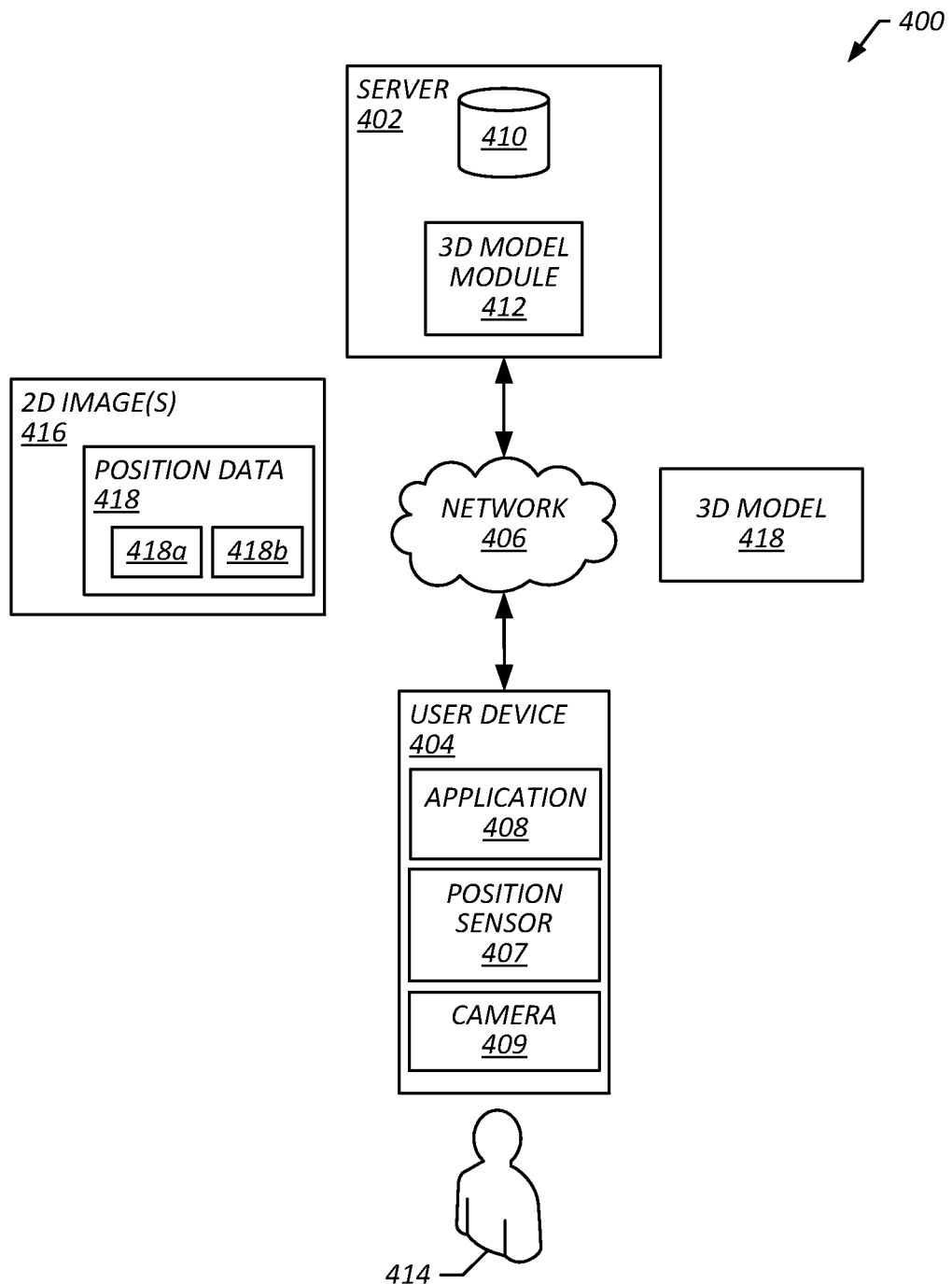
FIG. 4 is a block diagram that illustrates a modeling environment in accordance with one or more embodiments of the present technique.

FIG. 4 is a block diagram that illustrates a 3D modeling environment 400. Environment 400 includes a server 402 and a user device 404 communicatively coupled via a network 406. Network 406 may include an electronic communications network, such as the Internet, a local area network (LAN), a wide area network (WAN), a cellular communications network or the like. Network 406 may include a single network or combination of networks.

Device 404 may include any variety of mobile electronic devices. For example, device 404 may include a laptop computer, a tablet computer, a cellular phone, a personal digital assistant (PDA), a digital camera, a wearable computer with a head-mounted display/camera, or the like. In some embodiments, device 404 includes various input/output (I/O) interfaces, such as a graphical user interface (e.g., a display screen), an image acquisition device (e.g., a camera 409), an audible output user interface (e.g., a speaker), an audible input user interface (e.g., a microphone), a keyboard, a pointer/selection device (e.g., a mouse, a trackball, a touchpad, a touchscreen, a stylus, etc.), a printer, or the like. In some embodiments, device 404 includes a position sensor 407. Position sensor 407 may provide orientation/location data indicative of an orientation/location of device 404. Position sensor 407 may include, for example, an integrated gyroscope and/or a GPS device capable of providing the orientation/location data indicative of an orientation/location of device 404. In some embodiments, device 404 includes general computing components and/or embedded systems optimized with specific components for performing specific tasks. Device 404 may include an application 408. Application 408 may include one or more modules having program instructions that are executable by a computer system to perform some or all of the functionality described herein with regard to device 404. For example, application 408 may include program instructions that are executable by a computer system to perform some or all of the steps of method 100. In some embodiments, device 404 includes a computer system similar to that of computer system 1000 described below with regard to at least FIG. 5.

Server 402 may include a network entity that serves requests by client entities. For example, server 402 may serve requests by device 404. In some embodiments, server 402 hosts a content site, such as a website, a file transfer protocol (FTP) site, an Internet search website or other source of network content. In some embodiments, server 402 includes an image server for collecting, storing and serving images and/or 3D models. In some embodiments, server 402 includes or otherwise has access to data store 410. Data store 410 may include a database or similar data repository. Data store 410 may include an image repository for storing images and/or 3D models.

In some embodiments, server 402 includes a 3D model module 412. Module 412 may include program instructions that are executable by a computer system to perform some or all of the functionality described herein with regard to server 402. Module 412 may include program instructions that are executable by a computer system to perform some or all of the steps of method 100. In some embodiments, server 402 includes a computer system similar to that of computer system 1000 described below with regard to at least FIG. 5. Although server 402 is represented by a single box, server 402 may include a single server (or similar system), or a plurality of servers (and/or similar systems). For example, server 402 may include a plurality of different servers (and/or similar systems) that are employed individually or in combination to perform some or all of the functionality described herein with regard to server 402.

In some embodiments environment 400 is used to employ techniques described herein (e.g., the steps of method 100). For example, a user 414 may capture 2D images 416 (e.g., 2D images 202a-202g) of an object (e.g., edge 200) using camera 407 of user device 404. The images 416 may be transmitted from user device 404 to server 402 for processing by 3D module 412. 2D images 416 may include position data 418 (e.g., including orientation data 418a and/or location data 418b) associated there with. Position data 418 may be provided by position sensor 407 of user device 404. 3D model module 412 may process images 416 in as described with regard to method 100 to generate a corresponding 3D model of the object. For example, module 412 may receive image data for images 416 (e.g., as described with regard to block 102), identifying an image pair (e.g., as described with regard to block 104), identify a set of matching points for the image pair (e.g., as described with regard to block 106), generate a sensed rotation matrix and/or sensed translation vector for the image pair using sensed position data (e.g., as described with regard to block 108), generate a calculated transformation for the image pair using the set of matching points (e.g., as described with regard to block 110), generate sensed (or modified) transformation(s) for the image pair using the sensed rotation matrix and/or the sensed translation vector for the image pair (e.g., as described with regard to block 112), and determine error associated with the transformations for the set of matching points (e.g., as described with regard to block 114). If additional matching points for the image pair need to be considered, module 412 may repeat the above steps of generating a calculated transformation matrix for the image pair using the next set of matching points and generating sensed ("modified") transformation(s) for the image pair using the sensed rotation matrix and/or sensed translation vector for the image pair, and determining error associated with the transformations (e.g., as described with regard to block 116). If additional matching points for the image pair do not need to be considered, module 412 may select a transformation for the image pair (e.g., based on the determined errors for the transformations) (e.g., as described with regard to block 118), and update a 3D model 418 of the object using the selected transformation for the image pair (e.g., generating 3D coordinates using the selected model and adding them to the 3D model) (e.g., as described with regard to block 120). If additional image pairs remain to be processed, module 114 may repeat the corresponding steps for the next image pair (e.g., as described with regard to block 122). If no additional image pairs need to be updated, updated 3D model 418 may be provided (e.g., served to devices 404 or another user device for display, stored in data store 410, and/or the like). Although module 412 is illustrated as being employed by server 402, embodiments may include implementing some or all of the functionality of module 412 and/or an application 408 on any suitable device. For example, some or all of the functionality of module 412 may be provided on user device 404 (e.g., in place of or in conjunction with an application 408) such that the 3D modeling process can be completed by a user device 404.

Exemplary Computer System

Figure 5:
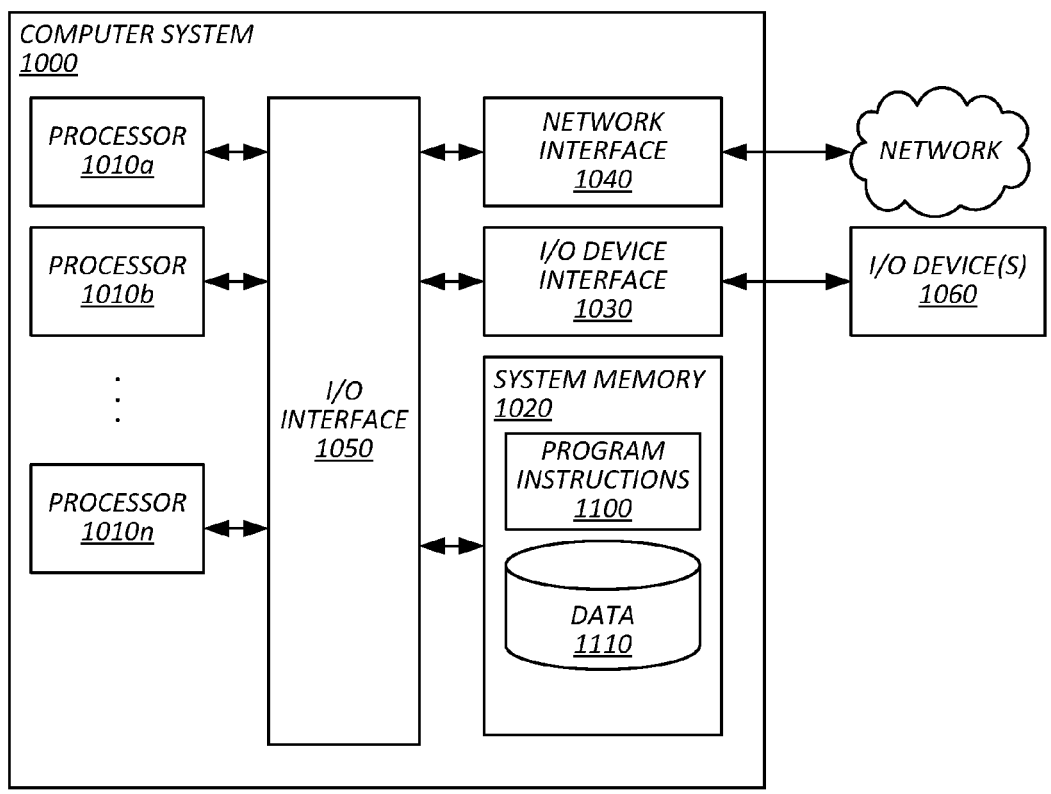
FIG. 5 is a block diagram that illustrates an exemplary computer system in accordance with one or more embodiments of the present technique.

FIG. 5 is a block diagram that illustrates an exemplary computer system 1000. Various portions of systems and methods described herein, may include or be executed on one or more computer systems similar to system 1000. For example, server 402 and/or user device 404 may include a configuration similar to at least a portion of computer system 1000. Further, methods/processes/modules described herein (e.g., module 412 and/or application 408) may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a non-transitory computer readable storage medium, such as a machine readable storage device, a machine readable storage substrate, a memory device, or any combination thereof, or the like. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for generating a three-dimensional (3D) model, the method comprising:
  receiving, by one or more computing devices, a first set of sensed position data indicative of an orientation of a camera device used to acquire a first two-dimensional (2D) image, wherein the first set of sensed position data is provided by a sensor of the camera device used to acquire the first 2D image;
  receiving, by the one or more computing devices, a second set of sensed position data indicative of an orientation of a camera device used to acquire a second two-dimensional (2D) image, wherein the second set of sensed position data is provided by a sensor of the camera device used to acquire the second 2D Image;

determining, by the one or more computing devices, a sensed rotation matrix for an image pair comprising the first and second 2D images using the first and second sets of sensed position data;

identifying, by the one or more computing devices, a calculated camera transformation matrix for the image pair, the calculated transformation comprising a calculated translation vector and a calculated rotation matrix, wherein identifying a calculated camera transformation, comprises, deriving a plurality of candidate calculated transformation matrices using a set of matching points of the first and second 2D images, wherein the candidate calculated transformation matrices each comprise a translation component and a calculated rotation matrix;

identifying a candidate calculated transformation matrix of the plurality of candidate calculated transformation matrices that is associated with the lowest transformation error; and identifying the candidate calculated transformation matrix that is associated with the lowest transformation error as the calculated camera transformation;

generating, by the one or more computing devices, a sensed camera transformation matrix for the image pair, the sensed camera transformation comprising a translation vector and the sensed rotation matrix;

identifying, by the one or more computing devices, a set of matching points of the first and second 2D images;

determining, by the one or more computing devices, whether a first error associated with a transformation of the set of matching points using the sensed camera transformation is less than a second error associated with a transformation of the set of matching points using the calculated camera transformation; and in response to determining, by the one or more computing devices, that a first error associated with a transformation of the set of matching points using the sensed camera transformation is less than a second error associated with a transformation of the set of matching points using the calculated camera transformation, generating a 3D model using the sensed camera transformation; and storing, by the one or more computing devices, the 3D model in an 3D model repository.

2. The method of claim 1, wherein deriving a plurality of candidate calculated transformation matrices using a set of matching points comprises:

computing a fundamental matrix between the first and second 2D images using a set of matching points;

computing an essential matrix based on the fundamental matrix; and decomposing the essential matrix into four candidate calculated transformation matrices via singular value decomposition.

3. The method of claim 1, wherein the set of matching points comprises a subset of a set of matching points of the first and second 2D images.

4. The method of claim 3, wherein the set of matching points comprises five matching points of a set of matching points of the first and second 2D images.

5. The method of claim 1, wherein determining whether a first error associated with a transformation of the set of matching points using the sensed camera transformation is less than a second error associated with a transformation of the set of matching points using the calculated camera transformation comprises:

selecting a subset of a set of matching points of the first and second 2D images;

determining a first error associated with a transformation between the subset of matching points using the calculated camera transformation;

determining a second error associated with a transformation between the subset of matching points using the sensed camera transformation; and comparing the first error and the second error to determine whether the first error associated with a transformation of the subset of matching points using the sensed camera transformation is less than a second error associated with a transformation of the subset of matching points using the calculated camera transformation.

6. The method of claim 1, wherein generating a 3D model using the sensed camera transformation matrix comprises:

transforming matching points of the set of matching points to 3D coordinates; and adding the 3D coordinates to the 3D model.

7. The method of claim 1, wherein the translation vector of the calculated camera transformation and the translation vector of the sensed camera transformation are the same.

8. The method of claim 1, wherein the first set of sensed position data is indicative of a location of a camera device at or near a time when it is used to acquire a first two-dimensional (2D) image, wherein the second set of sensed position data is indicative of a location of a camera device at or near a time when it is used to acquire a second two-dimensional (2D) image, the method further comprising:

determining a sensed rotation matrix for an image pair comprising the first and second 2D images using the first and second sets of sensed position data, wherein the translation vector of the sensed camera transformation comprises the sensed rotation matrix, and wherein the translation vector of the calculated camera transformation is calculated based on matching points of the first and second 2D image.

9. The method of claim 1, wherein the sensor comprises a gyroscope.

10. A non-transitory computer readable medium comprising program instructions stored thereon that are executable by a processor to cause the following steps for generating a three-dimensional (3D) model:

receiving a first set of sensed position data indicative of an orientation of a camera device used to acquire a first two-dimensional (2D) image, wherein the first set of sensed position data is provided by a sensor of the camera device used to acquire the first 2D image;

receiving a second set of sensed position data indicative of an orientation of a camera device used to acquire a second two-dimensional (2D) image, wherein the second set of sensed position data is provided by a sensor of the camera device used to acquire the second 2D Image;

determining a sensed rotation matrix for an image pair comprising the first and second 2D images using the first and second sets of sensed position data;

identifying a calculated camera transformation matrix for the image pair, the calculated transformation comprising a calculated translation vector and a calculated rotation matrix, wherein identifying a calculated camera transformation, comprises, deriving a plurality of candidate calculated transformation matrices using a set of matching points of the first and second 2D images, wherein the candidate calculated transformation matrices each comprise a translation component and a calculated rotation matrix;

identifying a candidate calculated transformation matrix of the plurality of candidate calculated transformation matrices that is associated with the lowest transformation error; and identifying the candidate calculated transformation matrix that is associated with the lowest transformation error as the calculated camera transformation;

generating a sensed camera transformation matrix for the image pair, the sensed camera transformation comprising a translation vector and the sensed rotation matrix;

identifying a set of matching points of the first and second 2D images;

determining whether a first error associated with a transformation of the set of matching points using the sensed camera transformation is less than a second error associated with a transformation of the set of matching points using the calculated camera transformation; and in response to determining that a first error associated with a transformation of the set of matching points using the sensed camera transformation is less than a second error associated with a transformation of the set of matching points using the calculated camera transformation, generating a 3D model using the sensed camera transformation; and storing the 3D model in an 3D model repository.

11. The medium of claim 10, wherein deriving a plurality of candidate calculated transformation matrices using a set of matching points comprises:

computing a fundamental matrix between the first and second 2D images using a set of matching points;

computing an essential matrix based on the fundamental matrix; and decomposing the essential matrix into four candidate calculated transformation matrices via singular value decomposition.

12. The medium of claim 10, wherein the set of matching points comprises a subset of a set of matching points of the first and second 2D images.

13. The medium of claim 12, wherein the set of matching points comprises five matching points of a set of matching points of the first and second 2D images.

14. The medium of claim 10, wherein determining whether a first error associated with a transformation of the set of matching points using the sensed camera transformation is less than a second error associated with a transformation of the set of matching points using the calculated camera transformation comprises:

selecting a subset of a set of matching points of the first and second 2D images;

determining a first error associated with a transformation between the subset of matching points using the calculated camera transformation;

determining a second error associated with a transformation between the subset of matching points using the sensed camera transformation; and comparing the first error and the second error to determine whether the first error associated with a transformation of the subset of matching points using the sensed camera transformation is less than a second error associated with a transformation of the subset of matching points using the calculated camera transformation.

15. The medium of claim 10, wherein generating a 3D model using the sensed camera transformation matrix comprises:

transforming matching points of the set of matching points to 3D coordinates; and adding the 3D coordinates to the 3D model.

16. The medium of claim 10, wherein the translation vector of the calculated camera transformation and the translation vector of the sensed camera transformation are the same.

17. The medium of claim 10, wherein the first set of sensed position data is indicative of a location of a camera device at or near a time when it is used to acquire a first two-dimensional (2D) image, wherein the second set of sensed position data is indicative of a location of a camera device at or near a time when it is used to acquire a second two-dimensional (2D) image, the method further comprising:

determining a sensed rotation matrix for an image pair comprising the first and second 2D images using the first and second sets of sensed position data, wherein the translation vector of the sensed camera transformation comprises the sensed rotation matrix, and wherein the translation vector of the calculated camera transformation is calculated based on matching points of the first and second 2D image.

18. The medium of claim 10, wherein the sensor comprises a gyroscope.

19. A computer-implemented method for generating a three-dimensional (3D) model, the method comprising:

receiving, by one or more computing devices, a first set of sensed position data indicative of a position of a camera device used to acquire a first two-dimensional (2D) image, wherein the first set of sensed position data is provided by an integrated sensor of the camera device used to acquire the first 2D image;

receiving, by the one or more computing devices, a second set of positioning sensor data indicative of a position of a camera device used to acquire a second two-dimensional (2D) image, wherein the second set of sensed position data is provided by an integrated sensor of the camera device used to acquire the second 2D image;

determining, by the one or more computing devices, a sensed rotation matrix and/or a sensed translation vector between the first and second 2D images using the first and second sets of sensed position data;

identifying, by the one or more computing devices, a calculated camera transformation comprising a calculated translation vector and a calculated rotation matrix, wherein identifying a calculated camera transformation, comprises, deriving a plurality of candidate calculated transformation matrices using a set of matching points of the first and second 2D images, wherein the candidate calculated transformation matrices each comprise a translation component and a calculated rotation matrix;

identifying a candidate calculated transformation matrix of the plurality of candidate calculated transformation matrices that is associated with the lowest transformation error; and identifying the candidate calculated transformation matrix that is associated with the lowest transformation error as the calculated camera transformation;

generating, by the one or more computing devices, a sensed camera transformation comprising the sensed rotation matrix and/or the sensed translation vector;

identifying, by the one or more computing devices, a set of matching points of the first and second 2D images;

determining, by the one or more computing devices, whether a first error associated with a transformation of the set of matching points using the sensed camera transformation is less than a second error associated with a transformation of the set of matching points using the calculated camera transformation; and in response to determining, by the one or more computing devices, that a first error associated with a transformation of the set of matching points using the sensed camera transformation is less than a second error associated with a transformation of the set of matching points using the calculated camera transformation, generating a 3D model using the sensed camera transformation; and storing, by the one or more computing devices, the 3D model in an 3D model repository.

* * * * *